Figure 1:
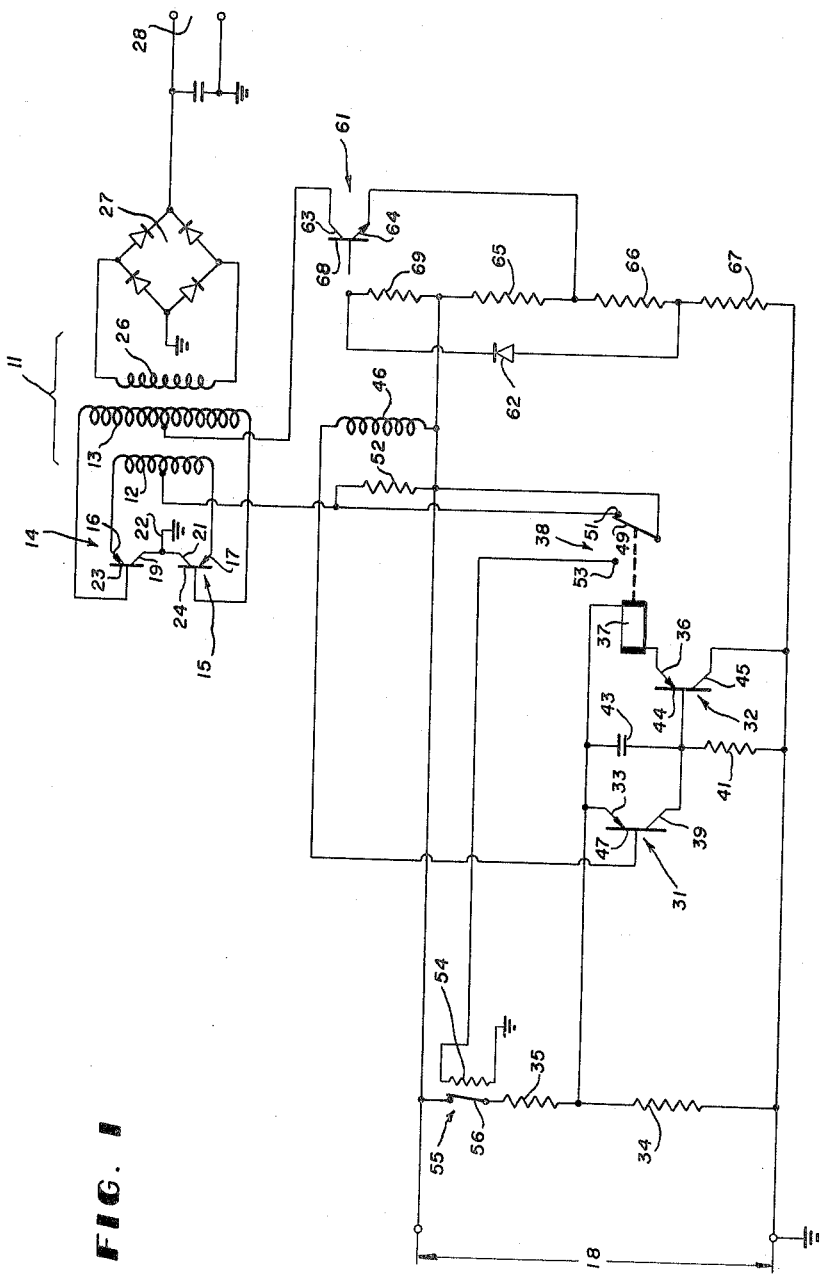

INVENTOR.
ATHERTON NOYES, JR.
BY
Mead, Browne, Schuyler & Beveridge
ATTORNEYS

3,161,834
PROTECTION CIRCUIT FOR TRANSISTOR POWER SUPPLY

Atherton Noyes, Jr., Mountain Lakes, N.J., assignor to Aircraft Radio Corporation, Boonton, N.J., a corporation of New Jersey
Filed Oct. 7, 1960, Ser. No. 61,121
6 Claims. (Cl. 331—62)

This invention relates to a transistor power supply of the type in which transistors are connected in an oscillator circuit and particularly concerns overload and surge protection circuits for the transistors.

In circuits of this type, as long as oscillation continues in a normal fashion and there is not an abnormal fluctuation in line voltage, the power supply will function satisfactorily. However, if for some reason the output of the power supply is short circuited, the normal oscillation stops. Collector current of the transistors then falls to a low value but this may not reach zero. Thus, in the non-oscillating condition, while the power input to the circuit is small, actual dissipation in the transistors may well be higher than it is during normal operation.

In all transistors, there is a reverse current through the collector-base diode. This current increases very rapidly with temperature so if there is any resistance in the base circuit, this reverse current flow produces a voltage drop which will forwardly bias the transistor. As a result, a much larger current flows in the emitter-collector circuit with a resultant increase in heat in the transistor and a further increase in the reverse current. This process is rapidly regenerative, so a point of destruction of the transistor is rapidly reached. Thus, the transistors in a power supply of this type may be destroyed if the output circuit is overloaded or short circuited even for a brief period of time.

Another difficulty encountered in power supplies employing transistors in a push-pull oscillating circuit is the known fact that when the circuit is oscillating the voltage on the cutoff transistor is approximately equal to twice the supply voltage. If oscillation stops, the voltage on the transistor is about equal to the supply voltage. Transistors, if rated at twice the supply voltage, will be considerably overloaded with an increase in the supply voltage because fluctuations in the supply voltage are apparently doubled when applied to the cutoff transistor in the oscillating circuit.

A major object of the present invention is to provide a protective circuit for a transistor power supply which will avoid destruction of the transistors in the event of an overload in the output circuit.

In the attainment of these objects, an important feature of the invention resides in the provision of a sensing circuit responsive to the amplitude of oscillation in the oscillator circuit of the power supply to control potentials applied to the transistors in the oscillator circuit when the amplitude of oscillation decreases below a safe level. More particularly, the sensing circuit responds to a decrease in the amplitude of oscillation to modify the potential applied to electrodes of the transistor to discontinue oscillation. In one form of the invention this is accomplished by increasing the resistance in the circuit between the source of D.C. potential and electrodes of the transistor. In another form, a control transistor in circuit between the oscillating transistors and a source of potential is rendered non-conductive. In this modified form, to further safeguard the transistors of the oscillating circuit, a reverse bias is applied to electrodes in the oscillating transistors.

Another important feature of the invention resides in the provision of a surge protection circuit responsive to an abnormal increase in the potential of the source for causing the circuit to discontinue oscillation and thereby prevent magnification of the potential applied to the non-conductive transistor while the circuit is oscillating. This is accomplished by a zener diode which becomes highly conductive when the potential of the source exceeds a desired value and using that diode to control the base of a transistor in the supply circuit for the oscillator to cause discontinuance of the oscillation while the surge persists.

Still another feature of the invention resides in provision of automatic recycling of the protective circuits periodically in order to re-start oscillation and normal operation of the power supply circuit as soon as the abnormal condition is removed.

Figure 2:
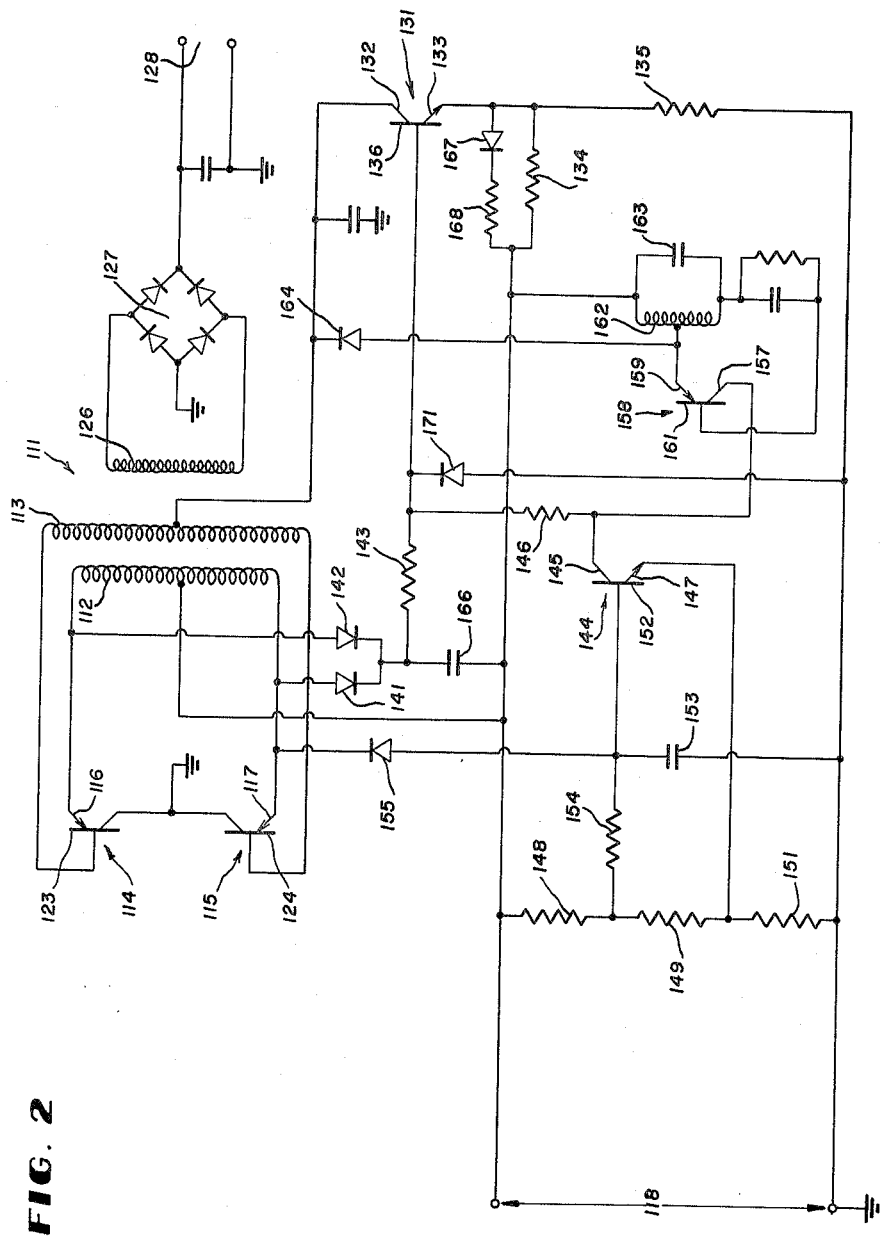

Other objects, advantages and features of the invention will become apparent from the following specification taken in conjunction with the accompanying drawings, wherein:

FIG. 1 shows a transistor power supply circuit embodying one form of the invention, and FIG. 2 shows a transistor power supply circuit embodying the invention in modified form.

In FIG. 1, the invention is embodied in a power supply circuit having a saturable core reactor 11 with its main winding 12 and feedback winding 13 connected in a conventional push-pull oscillator circuit with a pair of transistors 14 and 15. Thus, main winding 12 has its terminals connected to emitters 16 and 17 of the transistors 14 and 15 and its mid-point connected to the high voltage side of a source 18 of unidirectional potential. Collectors 19 and 21 of transistors 14 and 15 are grounded at 22 and the base electrodes 23 and 24 of the respective transistors are connected to opposite sides of feedback winding 13.

As is well known in circuits of this type, oscillation is started when one transistor becomes conductive and the feedback voltage applied to the base of the transistor causes it to conduct more heavily until the core of the reactor or transformer becomes saturated so that voltages induced in the windings fall and the currents decrease with a resultant decay in magnetic flux which induces voltages of opposite polarity rendering the other transistor conductive and repeating the process. This build up and decay of flux induces an output voltage in output winding 26 which is rectified at 27 to produce a high voltage direct current at output terminals 28.

To prevent excessive currents in transistors 14 and 15 in the event of a short circuit or overload in the circuit of secondary winding 26, an overload protection circuit includes a control transistor 31 and a protecting transistor 32 both of which are normally biased to cutoff. Emitter 33 of control transistor 31 is connected to an intermediate point on a voltage divider formed by resistors 34 and 35 across the source 18 of direct current potential and emitter 36 of protector transistor 32 is connected through a coil 37 of protective relay 38 to the same point between resistors 34 and 35. Collector 39 of control transistor 31 is connected through load resistor 41 to ground, and a control capacitor 43 is connected across the emitter-collector circuit of control transistor 31 and to base 44 of protective transistor 32 which has its collector 45 connected directly to ground.

Transistor 31 is biased beyond cutoff, but when the power supply is properly oscillating, voltage induced in sensing winding 46, which is inductively coupled to reactor 11, is applied to base 47 of control transistor 31 in opposition to the supply voltage so that the transistor 31 is rendered conductive on alternate half-cycles. The voltage applied to base 47 swings above and below the potential of source 18 with oscillation in the power supply and sensing winding 46. The square wave voltage induced in winding 46 is nearly equal in amplitude to the source voltage, under normal oscillation conditions. Consequently the negative half cycle lowers the potential of base 47 below the potential of emitter 33, and the transistor conducts heavily, thereby keeping condenser 43 discharged. If, however, the amplitude of the voltage in winding 46 decreases only slightly, as the result of a short circuit or overload, for example, base 47 will no longer be carried below emitter 33 at any point in the cycle, so condenser 43 is permitted to charge through resistor 41. This charging of capacitor 43 will decrease the positive potential on base 44 of protective transistor 32 and render the protective transistor 32 conductive with resulting current through coil 37 of protective relay 38.

This will cause movable contact 49 of protective relay 38 to transfer from its normal position closed with contact 51 and open the shunt across protective resistor 52 to insert resistor 52 in the circuit from potential source 18 to the midpoint of winding 12 and thereby lower the potential applied to emitters 16 and 17 of the transistors 14 and 15. Resistor 52 is large enough to substantially reduce the emitter voltage applied to the oscillating transistors and thereby stop oscillation and protect the transistors from destructive runaway. This circuit is quite sensitive because emitter 33 of control transistor 31 is at a relatively low potential and base 47 reaches, on negative half cycles, a still lower potential which is the difference of two relatively large voltages. This difference will change by a large amount with only a small change in induced voltage in winding 46. Thus, for the system designed to render control transistor 31 conductive on alternate half cycles of a particular operating voltage induced in sensing winding 46, a slight decrease in voltage induced in that winding will cause control transistor 31 to remain cut-off with the resulting charging of control capacitor 43 and operation of relay 38.

During the period required for oscillations to build up after starting, capacitor 43 begins to charge through resistor 41, and the voltage across coil 37 is approximately equal to the voltage across capacitor 43. Before capacitor 43 is charged sufficiently to cause operation of relay 38, oscillations will build up and cause transistor 31 to conduct as already described thereby rendering the protective circuit inoperative during the starting period.

To automatically re-cycle the protective circuit, so the system will not remain shut down in the case of temporary overload, energization of coil 37 moves contact 49 of relay 38 to engage stationary contact 53 and close a circuit to heater 54 of a temperature operated relay 55 having a movable contact 56. When heater 54 reaches a certain temperature contact 56 opens, thereby permitting condenser 43 to discharge and permitting relay 38 to return to its deenergized position, short circuiting protective resistor 52. Since heater 54 is no longer energized, movable contact 56 of heat responsive device 55 will again close and the system will resume normal operation unless the overload persists in which case the voltage induced in sensing winding 46 will be inadequate, control capacitor 43 will charge, and relay 38 will again be operated to protect transistors 14 and 15 in the power supply.

Damage to the power supply transistors 14 and 15 which might result from surges in the potential source 18 may be avoided by a surge protection circuit including as its major elements surge protection transistor 61 and control zener diode 62. Surge protection transistor 61 is of the NPN type and has its collector 63 connected to the mid-point of winding 13 on reactor 11 and its emitter 64 connected to a relatively high position on a voltage divider composed of resistors 65, 66 and 67. Base 68 of transistor 61 is connected to potential source 18 through resistor 69 so transistor 61 is normally biased in a conductive state to provide a circuit for the potential applied to the bases 23 and 24 of the power supply transistors 14 and 15 respectively. Zener diode 62 is normally non-conducting when potential source 18 is at its usual value.

Resistors 67 and 69 are selected so the voltage across zener diode 62 is of the order of 20 percent of the voltage of source 18 with a breakdown potential of zener diode 62 at about 25 percent of the potential of source 18. Thus, if there is a substantial surge in the potential source 18, the voltage across zener diode 62 will be sufficient to break down the diode and limit the potential applied to base 68. Since the potential rise of emitter 64 is not correspondingly limited, transistor 61 cuts off and interrupts the base circuit of power supply transistors 14 and 15 with a resulting discontinuance of the oscillation in the power supply. When oscillation stops, voltage in sensing coil 46 decreases so control capacitor 43 charges, protective transistor 32 conducts and relay 38 operates to place the system in its safe condition. Re-cycling, as previously described, will return the power supply to normal operation and if the surge of potential source 18 has disappeared, the power supply will continue in its normal operation.

In the form of the invention shown in FIG. 2, an overload and surge protection circuit is shown which accomplishes the same results as the circuit shown in FIG. 1 but utilizes electronic switching rather than a relay and provides a cutoff bias for the oscillator transistors in a different manner. As illustrated, transistors 114 and 115 are connected in a push-pull oscillating circuit with windings 112 and 113 of saturable core reactor 111 to convert the relatively low potential of source 118 to an alternating potential in winding 126 which is rectified at 127 to produce a higher voltage output at 128. Operation of this transistor power supply circuit is identical with that previously described and the dangers to transistors 114 and 115 are likewise identical when the output circuit of the supply is overloaded or surges occur in the direct current potential source 118.

Protection against surges and overload is provided primarily by protective transistor 131, of the NPN-type having its collector 132 connected to the mid-point of winding 113 which has its terminals respectively connected to bases 123 and 124 of the oscillator transistors 114 and 115. Emitter 133 is connected to potential source 118 at a point between voltage dividing resistors 134 and 135 to provide an emitter potential of approximately 80 percent of the source 118. Under normal operating conditions, protective transistor 131 is saturated in heavy conduction to provide a return path for the base circuit of the oscillating transistors 114 and 115. In the case of overload or potential surge the potential of base 136 of transistor 131 is automatically changed (as described below) to render transistor 131 non-conductive.

To control transistor 131, the potential of base 136 of protective transistor 131 is normally derived from potential source 118 through winding 112, crystal rectifiers 141 and 142 and resistor 143. Since emitter 133 is initially biased more negatively than base 136, transistor 132 is in a state of conduction and the oscillating circuit will begin to build up oscillation. As oscillations build up, the currents in the circuits of bases 123 and 124 of transistors 114 and 115 increase with a resultant reversal of current through transistor 131 and resistor 134 back to the circuits of emitters 116 and 117. As a result, the potential at the junction of resistors 134 and 135 rises above the potential of source 118 with a resultant increase in the potential applied to emitter 133 of protective transistor 131. In order to maintain transistor 131 in a state of saturated conduction, the oscillation voltage across winding 112 of the transformer is rectified by the full wave rectifiers composed of crystal diodes 141 and 142 which is supplied through resistor 143 to the base 136 and develops a potential almost double the potential of the source 118. Capacitor 166 smooths the output of the full wave rectifier composed of diodes 141 and 142 and may be quite small because the output of the oscillating circuit is a substantially square wave.

In parallel with resistor 134 is a crystal rectifier 167 in series with a small resistor 168 permitting current flow in the normal oscillating direction to reduce any power loss in resistor 134 and prevent the build-up of any current limiting bias during normal operation. This operation will continue as long as conditions remain normal.

Also connected to the circuit of base 136 is the collector circuit of a control transistor 144 which has its collector 145 connected through a fairly large load resistor 146 to the base 136 of transistor 131. Emitter 147 of this NPN-type control transistor 144 is connected to a low point of a voltage divider composed of resistors 148, 149 and 151. Base 152 is connected through resistor 154 to a point of slightly higher potential so in the absence of oscillation, transistor 144 is conductive. However, with normal oscillation the potential of emitter 117 falls almost to zero potential during the half cycle in which transistor 115 is conducting. Condenser 153 is thus maintained charged to a potential equal to the collector-emitter drop of transistor 115 by way of the current path through diode 155. Since this condenser voltage, in normal operation, is thus less than the voltage supplied to emitter 147 of transistor 144, transistor 144 is rendered non-conductive. In response to any of a number of abnormal conditions, control transistor 144 is caused to conduct by accumulation of a charge on capacitor 153 connected between the base 152 and ground. During starting operations, accumulation of a charge on capacitor 153 is delayed by resistor 154.

Should the amplitude of the oscillating potential in the windings of the saturable core transformer fall below a normal minimum, as due to an overload in the secondary circuit, or be reduced to zero because of some failure, capacitor 153 senses such a condition and begins to accumulate a charge until the voltage on base 152 of control transistor 144 is raised to a point where transistor 144 begins to conduct. Since the emitter 147 of transistor 144 is at a low potential, a very small abnormal increase in voltage drop across condenser 153 will serve to render transistor 144 conductive. The voltage on condenser 153 is the difference between the supply voltage and the voltage induced in one half of winding 112 (both relatively large voltages) so the voltage on condenser 153 changes rapidly with a small change in induced voltage in winding 112. As a result of current drawn by conduction of transistor 144 through load resistor 146, the potential of base 136 of protective transistor 131 is lowered well below the potential of emitter 133. Consequently protective transistor 131 is cut off and any oscillation in the circuit is terminated because the elimination of the return for the bases 123 and 124 of the oscillating transistors 114 and 115 respectively.

In addition to opening the return circuit for the bases of the oscillating transistors, conduction of control transistor 144 also lowers the potential applied to collector 157 of a transistor 158 which has its emitter 159 and base 161 in an oscillator circuit for oscillation at a frequency determined by the tuned circuit composed of inductance 162 and capacitor 163. When control transistor 144 is in a non-conductive state, the potential on collector 157 of transistor 158 is near the potential of source 118 to which emitter 159 is connected. When control transistor 144 begins to conduct, the potential applied to collector 157 is reduced to near ground potential. As a result transistor 158 becomes sufficiently conductive to oscillate at the frequency determined by the tuned circuit in the emitter-base circuit of the transistor. The A.C. voltage at emitter 159 during oscillation of this circuit is rectified by crystal rectifier 164 and applied as a cutoff bias through winding 113 to the bases 123 and 124 of the transistors 114 and 115 respectively. Thus, not only is the normal base return for the transistors in the power supply effectively opened by rendering protective transistor 131 non-conductive, but thermal runaway of the transistors 114 and 115 is further prevented by the reverse or definite cut off bias applied from transistor 158 through crystal rectifier 164 to the bases of the transistors in the power supply circuit.

Surges or excessive increases in the potential of source 118 cause conduction of zener diode 171 connected to the base 136 of protective transistor 131 and ground. This diode is selected to break down at a potential slightly greater than the design value for the source 118. If the potential source 118 increases excessively, zener diode 171 conducts and limits the potential of base 136 to the breakdown potential of the diode. However, since emitter 133 of control transistor 131 also rises with an increase in the potential source 118, a further increase in the source potential after the diode 171 becomes conductive will cut off the transistor 131.

When transistor 131 cuts off, the normal protective operation of the circuit begins because oscillations in the power supply are discontinued and sensing capacitor 153 begins to accumulate a charge. As sensing capacitor 153 begins to charge, control transistor 144 begins to conduct and retains protective transistor 131 in a cut off condition while starting oscillation of transistor 158 to apply a cut-off bias to the power supply transistors 123 and 124.

In any situation where the power supply is shut down by reason of the abnormal conditions mentioned, it may be restarted by disconnecting it from source 118 and then re-establishing the connection. This effectively returns the system to its quiescent state and it will begin to start up as heretofore described.

While two embodiments of the invention have been described, the invention may be incorporated in other types of circuits and other modifications will be apparent so the foregoing description is intended as illustrative and should not be construed in a limiting sense.

Having thus described the invention, what is claimed is:

1. In combination with a transistor oscillator having a pair of transistors connected in a push-pull oscillating circuit with a saturable core reactor and a source of unidirectional current, a sensing device coupled to the oscillating circuit for detecting a decrease in the amplitude of oscillations thereof and switch means between the source of unidirectional current, said switch means being electrically coupled to and actuated by said sensing device on a decrease in the amplitude of oscillation in the oscillating circuit for disconnecting the oscillator circuit from said source of unidirectional current, and a normally inoperative source of reverse bias potential, said source of reverse bias potential being rendered operative and applied to at least one electrode of each of the transistors in said oscillator circuit on actuation of said switch means by said sensing device.

2. In combination with a transistor power supply including an oscillating circuit having a pair of transistors connected to a source of unidirectional current, protective means including a switch for controlling the potential supplied from the source to the oscillating circuit, a control transistor for operating said protective switch means to one condition for supplying normal oscillating potentials to the circuit and another condition for modifying the said potential supplied from the source to interrupt oscillation of the circuit, a sensing device responsive to the amplitude of oscillation in the circuit for actuating said control transistor to operate said protective switch means to said one condition when the amplitude of oscillation in the circuit is normal and to said other condition when the amplitude of oscillation in the circuit is below normal, and another sensing device responsive to the potential of the source for causing said protective switch means to operate in said other condition upon an abnormal increase in the potential of the source.

3. In combination with a transistor power supply including an oscillating circuit having a pair of transistors connected to a source of unidirectional current, protective switch means for controlling the potential supplied from the source to the oscillating circuit, a control device for operating said protective switch means to one condition for supplying normal oscillating potentials to the circuit and another condition for modifying the potentials to interrupt oscillation of the circuit, a sensing device electrically coupled to the oscillating circuit responsive to the amplitude of oscillation in the circuit for actuating said control device to operate said protective switch means to said one condition when the amplitude of oscillation in the circuit is normal and to said other condition when the amplitude of oscillation in the circuit is below normal and means operated by said control device for de-energizing said control device to cause recycling thereof.

4. In a transistor oscillator having a pair of transistors connected in a push-pull oscillating circuit with a reactor and a source of unidirectional current supplying operating potentials to the said pair of transistors including the base electrodes thereof,
   a protection circuit for said transistors comprising,
   a normally conducting control transistor controlling the circuit path of operating base currents to said pair of transistors from said source,
   a normally nonconducting sensing transistor coupled to the said pair of transistors to sense the operating condition thereof and rendered conductive on overload operation of said pair of transistors,
   means connecting said sensing transistor to said control transistor to cause said control transistor to become nonconductive when said sensing transistor becomes conductive,
   detecting means for detecting an abnormal increase in the potential of said source; said detecting means being operatively coupled to said normally conducting control transistor to render same nonconducting on an abnormal increase in the potential of said source.

5. The circuit defined in claim 4 including a further transistor oscillator and circuit means normally rendering said further transistor oscillator inoperative,
   and means connecting said normally conducting control transistor to said further transistor oscillator to render said further transistor oscillator operative on nonconduction of said control transistor, said further transistor oscillator being connected to the first named oscillator circuit to apply reverse bias potentials to said pair of transistors.

6. The circuit as defined in claim 4 including means for removing operating potential from said sensing transistor to cause the recycling thereof.

References Cited in the file of this patent
UNITED STATES PATENTS

| | | |
|---|---|---|
| 2,956,240 | Englund | Oct. 11, 1960 |
| 3,012,205 | Brown | Dec. 5, 1961 |
| 3,038,127 | Wofford | June 5, 1962 |
| 3,048,718 | Starzec et al. | Aug. 7, 1962 |
| 3,079,543 | Dicker | Feb. 26, 1963 |
| 3,098,201 | Smedema et al. | July 16, 1963 |

FOREIGN PATENTS

| | | |
|---|---|---|
| 195,546 | Great Britain | Apr. 5, 1923 |
| 1,204,781 | France | Jan. 28, 1960 |